Patented Feb. 25, 1947

2,416,547

UNITED STATES PATENT OFFICE 2,416,547

DIRECT AZO DYES CONTAINING 3,5 DIHYDROXY BENZOYLAMINO GROUPS

Swanie S. Rossander and Chiles E. Sparks, Wilmington, Del., and James W. Libby, Jr., Louisville, Ky., assignors to E. I. du Pont de Nemours & Company, Wilmington, Del., a corporation of Delaware No Drawing. Application July 6, 1944,
Serial No. 543,730

7 Claims. (Cl. 260—159)

This invention relates to new soluble azo dyes which contain a 3,5-dihydroxy-benzoylamino group and to methods of making such dyes.

The new dyes are direct cotton dyes represented in general by the formula:

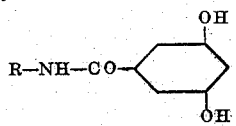

wherein R represents an aromatic radical containing at least one azo group. For example R may comprise a monoazo group such as

or a polyazo group, such as

or other configurations of the azo group. One or more 3,5-dihydroxy-benzoylamino groups may be present in the radical R. They are carried directly by the aryl nuclei of the components. When more than one such group is present, they may be present in the same or in different components of the dye. The dyes carry water solubilizing groups sufficient to make them soluble in water, such as sulfonic acid or carboxy. The dyes find use as direct dyes, more particularly for dyeing cellulosic fibers, such as cotton and regenerated cellulose rayon. Dyeings made with these dyes are susceptible to after-treatment with formaldehyde which improves the fastness properties of the dyeings.

A type of direct azo dyes of somewhat similar structure is known, except that the end group is an azo-resorcin group, which is made by coupling the diazo of an amino azo dye with resorcin, such as compounds being represented in general by the formula:

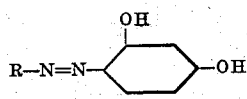

wherein R has the same value as in the above-described formula. The latter dyes are desirable in that dyeings can be made with them from dyebaths in a manner similar to that of making direct dyeings. The best washing fastness properties are attained with the azo-resorcin-end-group type of direct azo dyes by after-treating the dyeings with formaldehyde, wherein little, if any, change in shade is produced. The washing fastness of such dyeings is similar to the diazo or developed dyes and better than dyeings made with direct dyes and the brightness approaches that of direct dyes. Notwithstanding, however, the excellent general and special properties of the azo-resorcin-end-group type of direct azo dyes for cotton, it was desirable to provide azo dyes having the ease of application of those dyes and of direct dyes together with somewhat greater stability than either the azo resorcin or direct dyes, especially in respect to brightness and light fastness.

It is among the objects of the present invention to provide new soluble azo dyes which are capable of dyeing cellulosic fibers, such as cotton and regenerated cellulose rayon by direct dyeing methods, the dyeings from which are capable of being improved by after-treatment with formaldehyde, and which also have unusual brightness and light fastness properties as compared to dyes which are similar except that the end group or groups are azo-resorcin. Another object of the invention is to provide methods for manufacturing the new dyes. Other objects of the invention will be apparent from the following description.

The objects of the invention are attainable in general by providing an amino azo compound having at least one aryl nucleus substituted by a primary amino group and then forming with each primary amino group, as by condensation with a halide of 3,5-di(carbomethoxy-oxy)-benzoic acid or a halide of diacetyl-3,5-dihydroxybenzoic acid, a dihydroxybenzoylamino group. The objects are attained when any aryl nucleus of any component of the azo dye is directly substituted by the meta-dihydroxy-benzoylamino group. A component of the azo radical R of the general formula may comprise more than one aryl nucleus and accordingly the component may contain more than one meta-dihydroxybenzoylamino group. It is essential that the azo radical R contain a solubilizing group or groups sufficient to make the products soluble in water, such as sulfonic acid and carboxy.

It has now been discovered that dyeings produced with azo dyes thus substituted by the dihydroxy-benzoylamino group are amenable to after-treatment with formaldehyde and that such treatment greatly improves the washing fastness of the dyeings. It has further been discovered that the 3,5-dihydroxy-benzoylamino group when thus substituted on the azo compound does not in itself impair the light fastness of the nuclear dye molecule as does the substitution of an azo-resorcinol end component to such a dye nucleus. The objects of the invention may, therefore, be attained by using as the starting compound any amino-substituted azo dye such as $R-(NH_2)_n$ which also contains a water solubilizing group or groups sufficient to render the products soluble in water, and incorporating the dihydroxy-benzoyl group therein, as by condensation. By the above described condensation, there results a compound which produces direct dyeings having considerable improvement in the general stability of the dyeing. After treating with formaldehyde, the washing fastness of the dyeings are excellent and the dyes approach the developed azo dyes in this respect. The brightness and light fastness properties after formaldehyde treatment more closely approach that of the direct azo dyes having the basic azo structure which is represented by the symbol R in the above formula or by $R-NH_2$, than the type

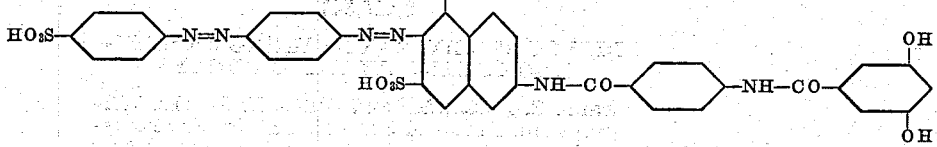

where the last component is the azo-resorcin group, such as the type

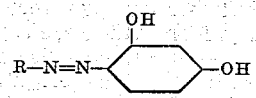

The invention will be more fully set forth in the following more detailed description which includes examples that are given as representative and illustrative embodiments of the invention and not as limitations thereof. Parts are expressed in parts by weight unless otherwise noted.

EXAMPLE 1

Dissolve 34.5 parts of the diazo dye, amino-azo-benzene-p-sulfonic acid→2-(4'-amino-benzoyl-amino)-5-naphthol-7-sulfonic acid in 1250 parts of water at 55° C. Slowly add to this solution during a period of 70 minutes a solution of 18.8 parts of 3,5-di-(carbomethoxy-oxy)-benzoyl chloride in 250 parts of acetone whilst stirring and maintaining the temperature at 55° C. During condensation the mixture of reactants should also be maintained just alkaline to Brilliant Yellow paper by gradually adding 170 parts of 0.5 normal sodium carbonate solution as the neutralizing

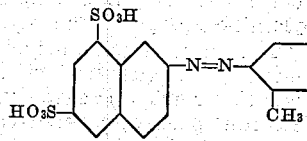

agent is needed. After the addition of the acid chloride is completed, the mixture is stirred for 30 minutes or until the condensation is completed. Then sufficient sodium carbonate is added to produce a definite alkaline reaction to Brilliant Yellow paper for hydrolyzing the carbomethoxy-oxy groups to hydroxy. Finally 150 parts of sodium chloride are added to salt out the product and the product is separated by filtration. The dye is then dried at 70° C.

The product is represented in its acid form by the formula

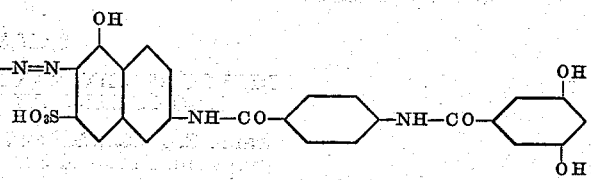

This product when dyed on viscose rayon by direct dyeing methods is blue-red. When after-treated with aqueous alkaline formaldehyde solution, the dyeing has excellent washing fastness and very good light fastness. The dyeing compares favorably in brightness with the direct dyeing made with the direct dye represented in its acid form by the formula

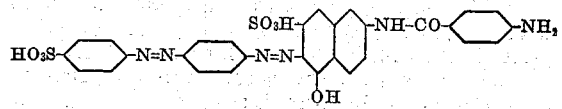

and the light fastness and washing fastness are far superior. The fastness to light is somewhat better than a similar dyeing similarly made with the dye which in the form of its acid is represented by the formula

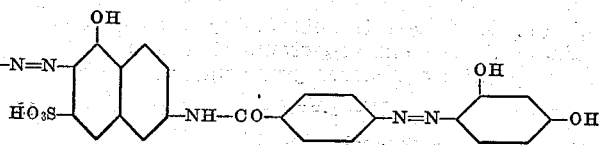

EXAMPLE 2

Dissolve 17 parts of the dye 2-naphthylamine-6,8-disulfonic acid→m-toluidine (condense the primary amino group with p-nitro-benzoyl chloride and thereafter reduce the nitro group to amino)→m-amino-phenyl-methyl-pyrazolone in approximately 2,000 parts of water. Cool to 0°–5° C. and, while maintaining faint alkalinity to Brilliant Yellow paper and excellent agitation at said temperature, gradually add over a period of 70 minutes a solution composed of 9 parts of 3,5-di-(carbomethoxy-oxy)-benzoyl chloride and 300 parts of acetone. 190 parts of ½ normal sodium carbonate solution are added during the course of this addition to maintain slight alkalinity. After all the acid chloride has been added, stir at 0°–5° C. for an additional 90 minutes and then stir for about 8 hours to allow the condensation to complete. Make the solution definitely alkaline to Brilliant Yellow test papers by the addition of soda ash and heat to 70° C. Then gradually salt out by adding 200 parts of sodium chloride. Then filter off the precipitated dyestuff and dry at 70° C.

In its acid form the compound is represented by the formula

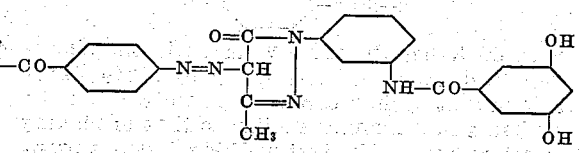

A dyeing made with this product on rayon fabric is a red-yellow shade which has very good washing fastness and good light fastness when the dyeing has been after-treated with an alkaline solution of formaldehyde. As compared to dyeings made with the nuclear direct dye and the dyeing made with a dye having the azo resorcin group on the last component of the nuclear azo radical, the new dye is superior in the respects noted in the preceding example.

EXAMPLE 3

Dissolve 8 parts of the dye represented by the formula

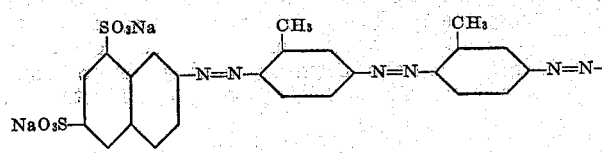

(2-naphthylamine-6,8-disulfonic acid→m-toluidine→m-toluidine→urea-m-phenylene - diamine )

in 1200 parts of water. Heat this solution to 55° C. and while maintaining good agitation, add over the course of 90 minutes a solution of 7.2 parts of 3,5-di(carbomethoxy-oxy)-benzoyl chloride in 225 parts of acetone. During this addition, maintain a slightly alkaline test on Brilliant Yellow test papers by the addition of 80 parts of ½ normal sodium carbonate solution as required. At this point test the completeness of the condensation by taking a small sample from the reaction mixture, dyeing it on cotton and developing ½ of the dyeing with beta-naphthol. The development with beta naphthol is done by treating ½ of the dyeing first with an aqueous solution of nitrous acid to diazotize the compound on the fiber and then treating with an alkaline solution of beta-naphthol. The presence of free amino groups is indicated if the developed piece is of a deeper shade than the direct dyeing. In case the condensation is not complete, add slowly a second portion of 2 parts of 3,5-di-(carbomethoxy-oxy)-benzoyl chloride dissolved in 60 parts of acetone to the reaction mixture in the same manner as described above. A second test should indicate complete condensation.

Then make the dye solution definitely alkaline to Brilliant Yellow test papers by the addition of soda ash, hydrolyze the carbomethoxy-oxy groups to hydroxy and finally precipitate the dye by the addition of salt. Filter off the product and dry.

A dyeing on rayon piece goods is yellow-brown in shade, and has very good washing fastness and good light fastness when after-treated with an alkaline solution of formaldehyde. As compared to the corresponding direct amino azo dye and the dyes having azo resorcin and components, the improvement in properties is similar to that described in the preceding examples.

In the form of its acid the product is represented by the formula

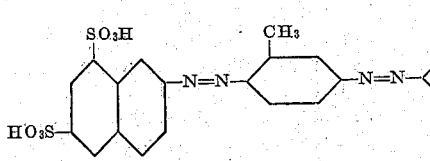

The following examples in Table I were prepared by methods similar to those described in the foregoing examples. In the table the arrows are directed away from the diazo component and the components are set down in the order of coupling. In order to make the final products, each primary amino group of the amino azo compounds thus represented was condensed with 3,5-di-(carbomethoxy-oxy)-benzoyl chloride in aqueous, slightly alkaline solution and the carbomethoxy-oxy groups were hydrolyzed to hydroxy, thereby producing the corresponding derivatives having the typical formula

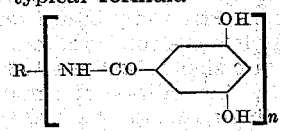

where $n$ represents the number of primary amino groups in the amino azo compounds set forth in the table. The term "shade" refers to the formaldehyde after-treated dyeing on regenerated cellulose rayon. These dyes have the desirable improved properties of the dyes of the foregoing examples:

Table I

| Ex. | The 3,5-dihydroxy-benzoyl derivatives of the following amino azo dyes | Shade |
|---|---|---|
| 4 | p-Amino-benzoyl-p-phenylene-diamine ⇌ (2-amino-5-naphthol-7-sulfonic acid)₂ | Red. |
| 5 | p-Amino-benzoyl-p-toluylene-diamine ⇌ [2-(3-amino-benzoyl-amino)-5-naphthol-7-sulfonic acid]₂ | Do. |
| 6 | p-Amino-benzoyl-m-phenylene-diamine ⇌ [1-(3'-amino-phenyl)-5-pyrazolone-3-carboxylic acid]₂ | Yellow. |
| 7 | 2-Naphthylamine-6,8-disulfonic acid ⟶ m-toluidine ⟶ m-toluidine (+ condense the primary amino group with p-nitro-benzoic acid chloride and thereafter reduce nitro group). | Orange. |
| 8 | Oxalyl-p-phenylene-diamine ⟶ 1-naphthylamine-6-sulfonic acid ⟶ 1-naphthylamine-6-sulfonic acid ⟶ 2-naphthol-7-sulfonic acid (+ hydrolyze the oxalyl group to amino). | Blue. |
| 9 | 2-Naphthylamine-6,8-disulfonic acid ⟶ m-toluidine ⟶ m-toluidine (+ condense the primary amino group with p-nitro-benzoic acid chloride and thereafter reduce the nitro group) ⟶ m,m'-diamino-diphenyl-urea. | Orange. |
| 10 | 2-Naphthylamine-6,8-disulfonic acid ⟶ m-toluidine ⟶ m-toluidine (+ condense the primary amino group with p-nitro-benzoic acid chloride and thereafter reduce the nitro group) ⟶ m-phenylene diamine. | Do. |
| 11 | (m-Amino-formanilide)₂ ⇌ 5,5'-dihydroxy-7,7'-disulfo-2,2'-dinaphthyl urea (+ hydrolyze the formyl groups to amino). | Scarlet. |
| 12 | Amino-azo toluene sulfonic acid ⟶ 3',5'-di(4''-amino-benzoyl)-amino-benzoyl-2-amino-5-naphthol-7-sulfonic acid. | Brown. |
| 13 | 2-Naphthylamine-6-sulfonic acid ⟶ 1-naphthylamine-6-sulfonic acid ⟶ m-toluidine ⟶ m,m'-diamino-diphenyl urea. | Do. |
| 14 | (Oxalyl-p-phenylene-diamine ⟶ 1-naphthylamine-6-sulfonic acid ⟶ 1-naphthylamine 6 sulfonic-acid and hydrolyze oxalyl groups to amino) ⇌ [2-(p-amino-benzoylamino)-5-naphthol-7-sulfonic acid]₂. | Blue. |
| 15 | Oxalyl-p-phenylene-diamine ⟶ 1-naphthylamine-6-sulfonic acid ⟶ 1-naphthylamine-6-sulfonic acid ⟶ 2-amino-5-naphthol-7-sulfonic acid (+ hydrolyze oxalyl group to amino). | Do. |

Any of the described condensation products of amino-azo dyes can be made by identical processes except that a halide of diacetyl-3,5-dihydroxy-benzoic acid is used instead of 3,5-di(carbomethoxy-oxy)-benzoyl chloride. Similarly other halides of 3,5-di-(carbomethoxy)-benzoic acid can be used such as the bromides. The methods of condensing with the amino-azo compound in aqueous solution are in general the same in both cases. The following is a typical example:

EXAMPLE 16

Heat to 55°–60° C. five parts of the dye, amino-azo - benzene - sodium - sulfonate→2-(4'-aminobenzoylamino)-5-naphthol-7-sulfonic acid which is dissolved in 300 parts of water. Add a chloroform solution of 4 parts of diacetyl-3,5-dihydroxy-benzoyl chloride to this solution slowly. During the period of this addition, maintain good agitation, a temperature of 55°–60° C., and a slight alkalinity to Brilliant Yellow papers, by the addition of small amounts of soda ash. After the condensation is completed, add sodium hydroxide until the solution is definitely alkaline to Brilliant Yellow test papers and raise the temperature to 80° C. to complete the hydrolyzation. Finally salt out by adding 60 parts of salt. Filter off the dye and dry it. The product is a water soluble dye which dyes cellulosic fibers from dyebaths. A dyeing on cotton cloth is of a blue-red shade and when after-treated with an alkaline formaldehyde solution exhibits very good washing fastness. The product is represented by the same formula as the product of Example 1.

EXAMPLE 17

Dissolve 2 parts of the dye, amino-azo-benzene-p-sodium sulfonate→J-acid, in water and add 1½ parts of diacetyl-3,5-dihydroxy-benzoyl chloride in chloroform solution slowly while maintaining good agitation and a slight alkalinity to Brilliant Yellow test paper. Raise the temperature gradually to 60° C. and then add 1 part more of the acid chloride dissolved in a small amount of chloroform. Stir the mixture for 3 hours at 60° C. to complete the condensation. During this period maintain slight alkalinity to Brilliant Yellow papers by the addition of small amounts of soda ash. Finally, make the dye solution definitely alkaline to Brilliant Yellow papers by the addition of soda ash; raise the temperature of the solution to 80° C. and hold it there for ½ hour to complete the hydrolyzation of the acetyl groups. Salt out by adding an amount of salt equivalent to 20% of the volume of the dye solution and 4 parts of a 2 normal solution of sodium hydroxide; stir for several minutes. Finally, add 4 parts of a 2 normal solution of acetic acid. The dye slowly precipitates out upon further stirring, and is filtered off and dried. The product is a water soluble dye which dyes cellulose fibers from dyebaths and is represented by the formula

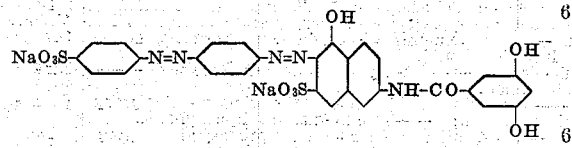

A dyeing on viscose rayon cloth is a blue-red shade, and when after-treated with aqueous alkaline formaldehyde, possesses very good washing fastness.

An alternative method of producing products in accordance with this invention consists in condensing the intermediate containing the amino group with either diacetyl-3,5-dihydroxy-benzoyl chloride or with 3,5-di-(carbomethoxy-oxy)-benzoyl chloride and then coupling the resulting intermediate with the diazo of an amino base which may be a single compound or an amino substituted azo compound, and finally subjecting the protective acetyl or carbomethoxy groups to an alkaline hydrolysis as hereinbefore described for forming the dihydroxy benzoyl amino group or groups. The following example is illustrative.

EXAMPLE 18

Dissolve 3 parts of J-acid (2,5,7-amino-naphthol-sulfonic acid) in about 200 parts of water with the aid of enough soda ash to leave the solution just alkaline to litmus paper. Add sufficient acetic acid to bring the solution just acid to litmus. Then add 2 parts of a 2 normal solution of sodium acetate. Dissolve 3 parts of 3,5-di-(carbomethoxy-oxy)-benzoyl chloride in a small amount of acetone. While continually stirring the J-acid solution at room temperature, add slowly the acetone solution of the acid chloride. At the same time, add a solution of sodium carbonate slowly to maintain the pH of the J-acid solution just on the alkaline side to Brilliant Yellow test papers. After stirring for one hour, there should be no test for free amine as determined by removing a small sample, acidifying with hydrochloride acid, adding a few drops of sodium nitrite solution and spotting this solution on filter paper impregnated with phenyl J-acid and alkali.

Slurry 1.1 parts of p-amino-benzoyl-p-phenylene diamine in 50 parts of water. Add 1 part of hydrochloric acid, stir to complete solution and add ice to bring the temperature to 5° C. Add 0.7 part sodium nitrite and stir one-half hour, maintaining a light excess of nitrite as indicated by starch-potassium iodide test paper, through the addition of additional nitrite if necessary. Hold the temperature between 6° and 8° C. At the end of the one-half hour period, destroy the excess nitrite by the addition of sulfamic acid. Cool the solution of N-(3,5-dicarbomethoxy-oxybenzoyl)-2,5,7-amino-naphthol-sulfonic acid prepared above, and add two parts of sodium carbonate. To this solution add slowly the solution of tetrazo p-amino-benzoyl-p-phenylene-diamine prepared above and stir overnight. To this dye solution then add 7 parts of aqueous ammonia. Stir for 3 hours at room temperature, then add 24 parts of acetic acid and hydrolyze off the carbomethoxy groups by heating to 65° C. The solution at this point is filtered off and dried. This product is identical with the first dyestuff set forth in Example 4 and in its acid form it is represented by the formula

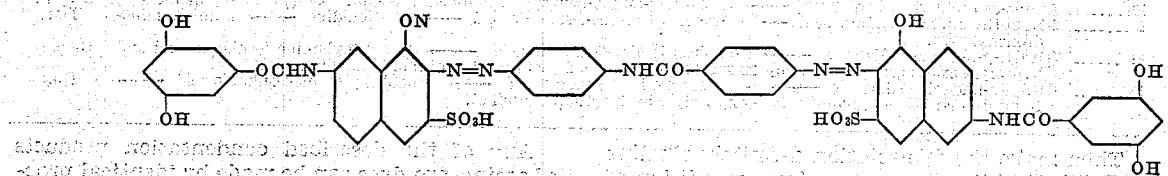

A direct dyeing made with this product on cotton piece goods is a blue-red shade, and has very good washing fastness when the dyeing is after-treated with a solution of formaldehyde made alkaline with soda ash.

A typical dyeing procedure consists in making a dyebath by dissolving 0.3 gram of the product of Example I in 100 cc. of water at 190°–200° F. and adding 0.06 gram of sodium carbonate to assist the dyeing, diluting with water at 160° F. to a total volume of 400 cc. while stirring and then adding 50 cc. of a 10% solution of Glauber's salt. Wet out a 10 gram piece of viscose rayon with water, squeeze partially dry and place in the dyebath. Raise the temperature of the dyebath to 180°–190° F. during a period of 15 minutes and hold at that temperature for 1 hour. Stir at frequent intervals during the dyeing. At the end of 1 hour remove the dyeing and rinse with cold water.

The after-treatment with formaldehyde in a fresh bath is done by adding the rinsed dyeing from the above operation to 500 cc. of water at a temperature of 130°–140° F. and then adding to the water 10 cc. of a 10% formaldehyde solution (25 cc. of approximately 37% formaldehyde by weight, diluted to 250 cc. with water), plus 0.3 gram of sodium carbonate. Hold the after-treating bath at this temperature for 20 minutes, remove the dyeing, rinse and dry.

The after-treatment in the dyebath may also be done by an alternative procedure which is the preferred procedure because of its economy and ease of application. Accordingly, at the end of the dyeing period, add to the dyebath 10 cc. of the 10% formaldehyde solution at the bath temperature and 0.3 gram sodium carbonate or sufficient to make the solution alkaline. Turn the dyeing for 20 minutes, then remove, rinse and dry.

From the foregoing disclosure it will be recognized that the invention is susceptible of modification without departing from the spirit and scope thereof and it is to be understood that the invention is not restricted to the specific illustrations herein set forth.

We claim:

1. A direct cotton azo dye represented by the formula

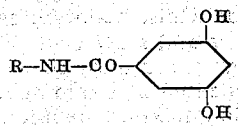

wherein R represents an aromatic radical containing at least one aryl nucleus and at least one azo group; and wherein at least one m,m'-dihydroxy-benzoyl amino group is substituted directly on an aryl nucleus; said compound containing water solubilizing groups sufficient to render the dye soluble in water.

2. A direct cotton azo dye in accordance with claim 1 in which an aryl nucleus of only one component is substituted by at least one m,m'-dihydroxy-benzoyl-amino group.

3. The azo dye which in the form of its acid is represented by the formula

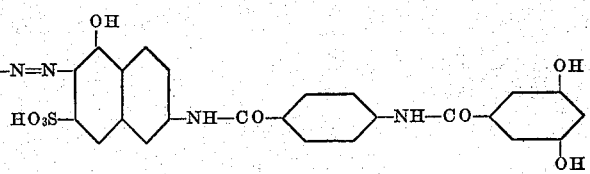

4. The azo dye which in the form of its acid is represented by the formula

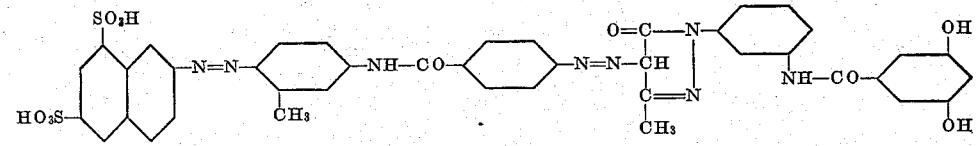

5. The azo dye which in the form of its acid is represented by the formula

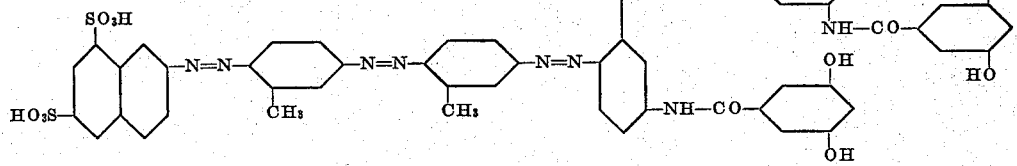

6. The process of making an azo compound containing a 3,5-dihydroxy-benzoylamino group which comprises making a water solution of a soluble azo dye, at least one component of which contains an aryl nucleus substituted directly by a primary amino group, heating the solution in the presence of a compound of the group consisting of di-(carbomethoxy-oxy)-benzoyl halides and diacetyl-3,5-dihydroxy-benzoyl halides whilst maintaining a condensation temperature and a pH value just alkaline to Brilliant Yellow paper until the primary amino group is condensed with said halide, then making the reaction mixture definitely alkaline to Brilliant Yellow paper and heating the mixture until the condensed substituent is hydrolyzed to a 3,5-dihydroxy-benzoylamino group.

7. The process of making an azo compound containing a 3,5-dihydroxy-benzoylamino group which comprises making a water solution of a soluble azo dye having two primary amino groups directly attached to aryl nuclei thereof, heating the solution in the presence of a compound of the group consisting of di-(carbomethoxy-oxy)-benzoyl chloride and di-acetyl-3,5-dihydroxy-benzoyl chloride whilst maintaining a condensation temperature and a pH value just alkaline to Brilliant Yellow paper until the primary amino groups are condensed with said halide, then making the reaction mixture definitely alkaline to Brilliant Yellow paper and heating the mixture until the condensed substituents are hydroylzed to 3,5-dihydroxy-benzoyl-amino groups.

SWANIE S. ROSSANDER.
CHILES E. SPARKS.
JAMES W. LIBBY, Jr.

REFERENCES CITED

The following references are of record in the file of this patent:

UNITED STATES PATENTS

| Number | Name | Date |
| --- | --- | --- |
| 1,943,727 | Fleischhauer | Jan. 16, 1934 |
| 2,182,347 | Murphy et al. | Dec. 5, 1939 |
| 2,357,977 | Rossander | Sept. 12, 1944 |
| 2,195,089 | Kollmann | Mar. 26, 1940 |

FOREIGN PATENTS

| Number | Country | Date |
| --- | --- | --- |
| 370,606 | British | Apr. 14, 1932 |

Certificate of Correction

Patent No. 2,416,547. February 25, 1947.

SWANIE S. ROSSANDER ET AL.

It is hereby certified that errors appear in the printed specification of the above numbered patent requiring correction as follows: Column 3, line 56, for "diazo" read *disazo*; column 6, line 9, for "and components" read *end components*; lines 26 to 29, for that portion of the formula reading

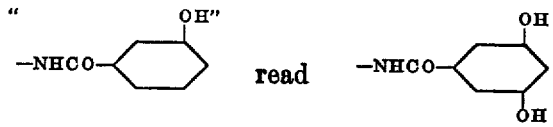

column 7, line 58, for "cellulose" read *cellulosic*; column 8, at the bottom of the page, left-hand portion of the formula, for

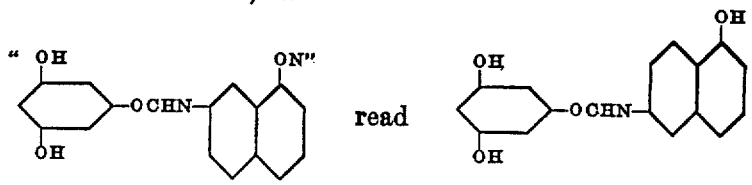

and that the said Letters Patent should be read with these corrections therein that the same may conform to the record of the case in the Patent Office.

Signed and sealed this 22nd day of April, A. D. 1947.

[SEAL]

LESLIE FRAZER,
*First Assistant Commissioner of Patents.*